W. S. HARLEY.
THREE WHEEL TRUCK.
APPLICATION FILED MAR. 8, 1913.

1,092,910.

Patented Apr. 14, 1914.
3 SHEETS—SHEET 3.

UNITED STATES PATENT OFFICE.

WILLIAM S. HARLEY, OF MILWAUKEE, WISCONSIN.

THREE-WHEEL TRUCK.

1,092,910.  Specification of Letters Patent.  Patented Apr. 14, 1914.

Application filed March 8, 1913. Serial No. 752,967.

*To all whom it may concern:*

Be it known that I, WILLIAM S. HARLEY, a citizen of the United States, and resident of Milwaukee, in the county of Milwaukee and State of Wisconsin, have invented certain new and useful Improvements in Three-Wheel Trucks; and I do hereby declare that the following is a full, clear, and exact description thereof.

The object of my invention is to provide a simple, durable and economical three-wheel truck, the construction and arrangement being such that a standard type of motorcycle, with the exception of the front fork and steering wheel, is utilized as the basis about which a truck frame is constructed, the said frame being light and strong for the support of a truck body and at the same time having sufficient flexure to permit compensation under the ordinary road conditions.

With the above objects in view the invention consists in certain peculiarities of construction and combination of mechanical elements as hereinafter particularly set forth with reference to the accompanying drawings and subsequently claimed.

Figure 1:
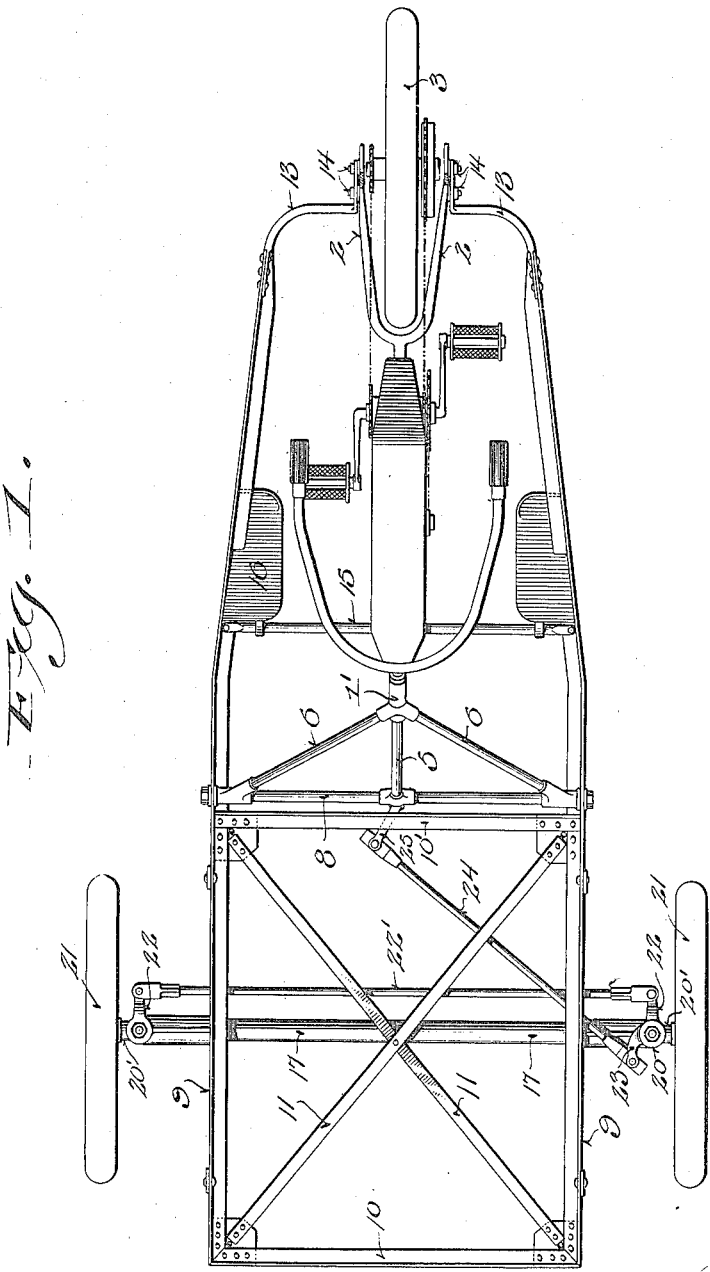
Figure 2:
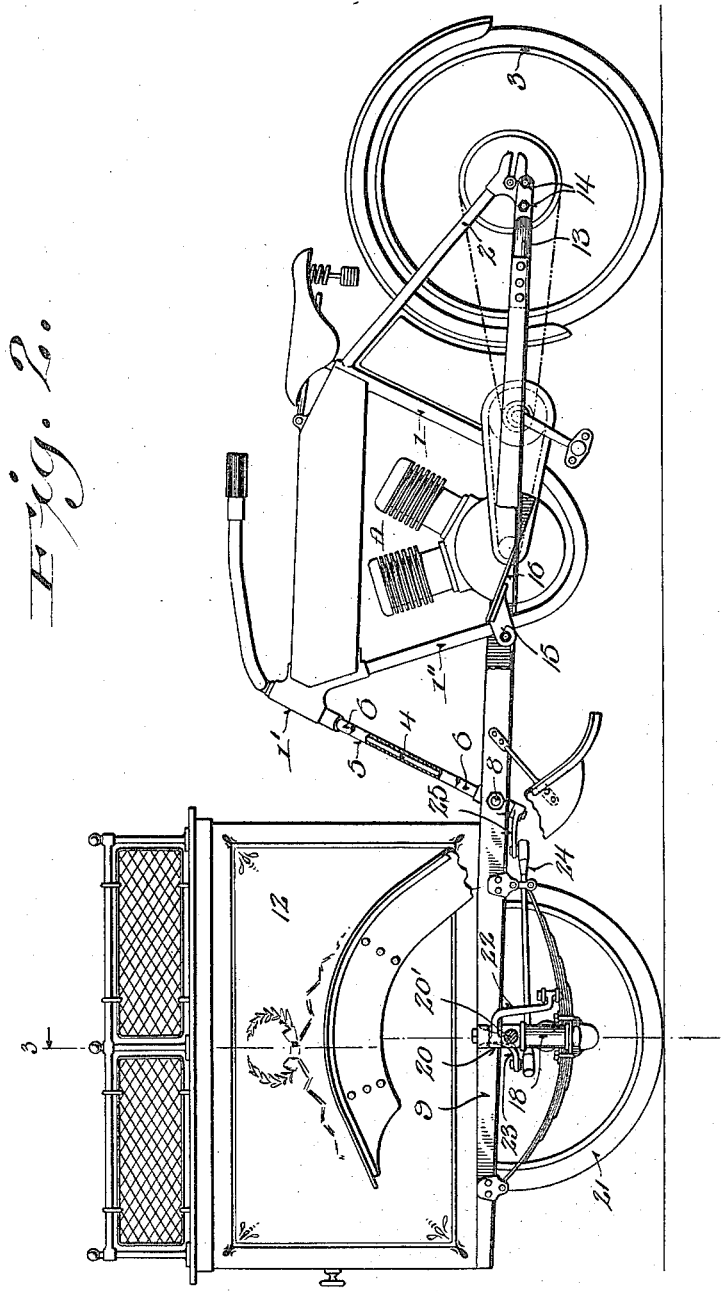
Figure 3:
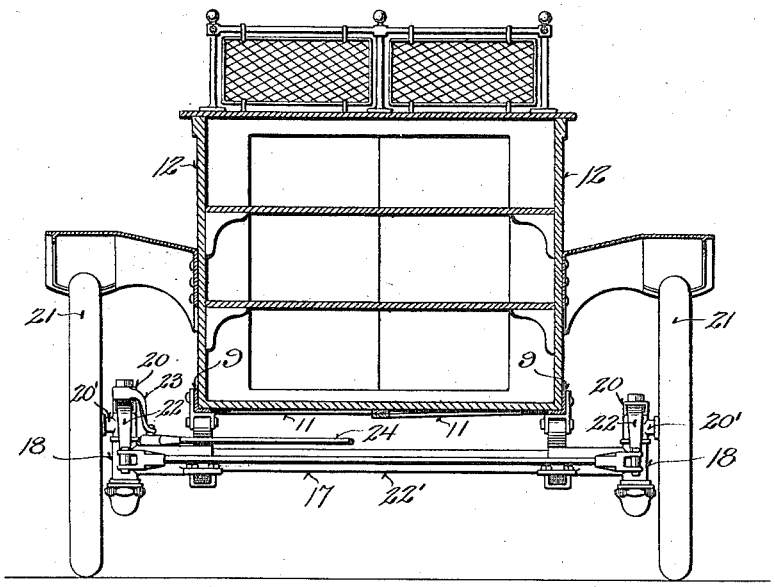

In the drawings Figure 1 represents a plan view of a truck embodying the features of my invention with the body thereof removed, whereby structural features of the frame are exposed; Fig. 2, a side elevation of the same with parts broken away and parts in section to more clearly illustrate certain structural features, and Fig. 3, a detailed cross-section of the truck, the section being indicated by line 3—3 of Fig. 2.

Referring by characters to the drawings, 1 represents the looped frame of a standard type of motorcycle provided with the usual rear fork 2, the motor or engine A being sustained within the loop of the frame and in gear connection with the rear wheel 3, as shown, all of which construction forms no part of my invention.

In constructing a truck in accordance with my invention the front or steering wheel and its fork is removed from the steering head 1'; into which steering head is fitted an elongated steering stem 4 that is connected in any suitable manner to the handle-bar. The steering stem 4 is loosely mounted within an obliquely disposed tubular bar 5 which bar is brazed or otherwise secured to the steering head. The upper end of the bar 5 has secured thereto the converging ends of brace tubes 6, 6, the lower ends of which brace tubes are secured by a suitable fitting to a horizontally disposed tube bar 8, the said bar together with the bars 5 and 6 forming a fixed spider for the support of the forward end of the motorcycle frame. The ends of the horizontally disposed transverse tube-bar 8 are secured to parallel angle-iron side-struts 9, 9, that constitute the main members of a truck-frame which is built about the motorcycle frame referred to. These side-struts extend forwardly of the spider connection and are cross connected by parallel transverse front and rear angle-iron struts 10, 10' respectively, which struts and the side struts are provided at their intersecting corners with web-plates for attaching oblique tie-strips 11, whereby the side-struts and their connections are held rigid in opposition to horizontal twist. Thus it will be seen that the front portions of the side-struts, in conjunction with the front and rear transverse struts 10 and 10' form a rectangular seat for a truck body 12, the bottom of which may be conveniently seated between the flanges of the struts.

Just rearward of the spider connections, between the motorcycle frame and truck frame proper, the side struts 9 are slightly converged whereby they terminate adjacent to the rear wheel 2 and are connected at their ends to the lower rear fork member by elbow bars 13, which bars are riveted to the ends of the struts and are secured to said rear fork member by suitable retaining bolts 14, the axle web of the fork member being apertured for the reception of said bolts.

In order to effect a more rigid connection between the motorcycle frame proper and the truck-frame, the side-struts of said truck-frame also carry a transversely disposed tie-bar 15, which tie-bar is brazed or otherwise secured to the front reach 1'' that constitutes part of the looped frame of the motorcycle. The tie-bar 15 also serves as a retainer for foot-rest blocks 16, the same being further supported by a slot engagement with the side-struts of the truck-frame.

Suitable semi-elliptical leaf-springs are clipped to the under face of that portion of the side-strut 9 which is utilized for supporting the truck body. Secured to the springs is a front axle 17 having vertically disposed barrels 18 for the reception of fulcrum studs (not shown) that form parts of steering knuckles 20. These steering knuckles are provided with the usual axle spindles 20' upon which are mounted the front wheels 21 of the truck. Arms 22 of the steering knuckles are connected by a standard type of floating tie-rod 22' and one of the steering knuckles carries an arm 23, which arm is connected to the lower projecting end of the steering stem 4 by a steering rod 24 through a lever 25 that is rigidly secured to the stem end.

From the foregoing description it is apparent that by utilizing a standard type of motorcycle frame, in combination with the elements constituting the truck-frame, said construction will result in a simple and economically arranged vehicle of the character described, which can be conveniently steered and otherwise manipulated by the operator, there being sufficient flexure in the rear connection between the truck-frame members and motorcycle frame to compensate for uneven road conditions whereby the front wheels may rise and fall, while at the same time the traction-wheel is held to its work.

I claim:

1. In a truck of the character described, a motorcycle frame having a steering head; a rear fork, a traction-wheel mounted therein, and a steering stem mounted in the head; the combination of a spider secured to the steering head about the stem, one of the members of which serves as a jacket for said stem, a rectangular body-receiving frame surrounding the motorcycle frame, the same comprising side struts extending forwardly of said motorcycle frame, means for securing the spider to said side struts, a forwardly disposed axle secured to the aforesaid side struts, wheel-carrying knuckles mounted upon the axle ends, a steering mechanism connecting the knuckles and before mentioned stem, and securing means connecting the rear portion of the motorcycle frame and truck frame side struts.

2. In a truck of the character described, a motorcycle frame having a steering head, a rear fork, a traction-wheel mounted therein, and a steering stem mounted in the head; the combination of a spider secured to the steering head about the stem, one of the members of which serves as a jacket for said stem, a rectangular body-receiving frame surrounding the motorcycle frame, the same comprising side struts extending forwardly of said motorcycle frame, means for securing the spider to said side struts, a forwardly disposed axle secured to the aforesaid side struts, wheel-carrying knuckles mounted about the axle ends, a steering mechanism connecting the knuckles and before mentioned stem, and means connecting the aforesaid side struts to the rear fork of the motorcycle frame.

3. In a three-wheel truck, a motorcycle frame having a rear fork, a traction-wheel mounted therein, and a steering head in connection with the forward portion of the frame; the combination of a spider secured to the steering head, a steering stem extending through one of the spider members, a rectangular body-receiving frame surrounding the motorcycle frame, the same comprising side struts extending forwardly of the motorcycle frame, transverse struts connecting the side struts forwardly of said motorcycle frame, a body supported upon said side and transverse struts, means for securing certain of the spider members to the side struts, means for securing the rear ends of the side struts to the rear fork member of said motorcycle frame, a front wheel-carrying axle suspended from the side struts of the truck-frame, wheel-carrying knuckles mounted thereon, and steering mechanism carrying the wheel-carrying knuckles and steering stem.

4. In a three-wheel truck, a motorcycle frame having a steering head, a rear fork, and a traction-wheel mounted therein; the combination of an obliquely disposed tube secured to the steering head, a transversely disposed brace-tube connected to the lower end of the obliquely disposed tube, angular tie-tubes connecting the first tube and upper end of the obliquely disposed tube, the said series of tubes constituting a spider for the support of the forward end of the motorcycle frame, a rectangular body-receiving frame surrounding the motorcycle frame, the same comprising side struts, transverse struts connecting the side struts forwardly of the motorcycle frame, means for securing the horizontal tube member of the spider to the side struts, means for securing the rear ends of the side struts to the fork member of the aforesaid motorcycle frame, an axle supported by the side struts forwardly of the motorcycle frame, swivel-wheels carried by the axle, a steering stem extending through the oblique tube member of the spider, and steering mechanism connecting the stem and swivel wheels.

In testimony that I claim the foregoing I have hereunto set my hand at Milwaukee in the county of Milwaukee and State of Wisconsin in the presence of two witnesses.

WILLIAM S. HARLEY.

Witnesses:
EDWIN F. CASPER,
E. J. MUELLER.